E. H. Ashcroft,
Globe Valve,
Nº 83,902. Patented Nov. 10, 1868.

Witnesses
L. Hailer,
P. T. Dodge.

Inventor:
E. H. Ashcroft
by Dodge & Munn
his Attys

E. H. ASHCROFT, OF BOSTON, MASSACHUSETTS.

Letters Patent No. 83,902, dated November 10, 1868.

IMPROVEMENT IN GLOBE-VALVES FOR STEAM AND OTHER ENGINERY.

*The Schedule referred to in these Letters Patent and making part of the same.*

*To all whom it may concern:*

Be it known that I, E. H. ASHCROFT, of Boston, in the county of Suffolk, and State of Massachusetts, have invented certain new and useful Improvements in Valves; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to improvements in globe, angle, check, and other valves for steam and other enginery, and consists in providing the ends of their casings or bodies with a bushing, made of the ordinary composition of tin and copper, or their equivalents, as hereinafter described.

In the drawings—

To the use of valves made entirely of iron, as is well known, there is an objection, owing to their liability to split when the connecting-pipes are screwed in hard enough to make a close, steam-tight joint, for the reason that between iron and iron the yielding quality is very limited. In fitting iron pipes to valves, as heretofore constructed, care has to be taken. And to brass bodies of valves the steam-fitter is obliged to be very careful in attaching the pipes, lest the ends of the body be fractured or enlarged, in which event they are rendered worthless. The tendency of the manufacturers towards light weight renders this loss much greater, as the requisite amount of stock is not put into the ends of the valves.

Figure 1:
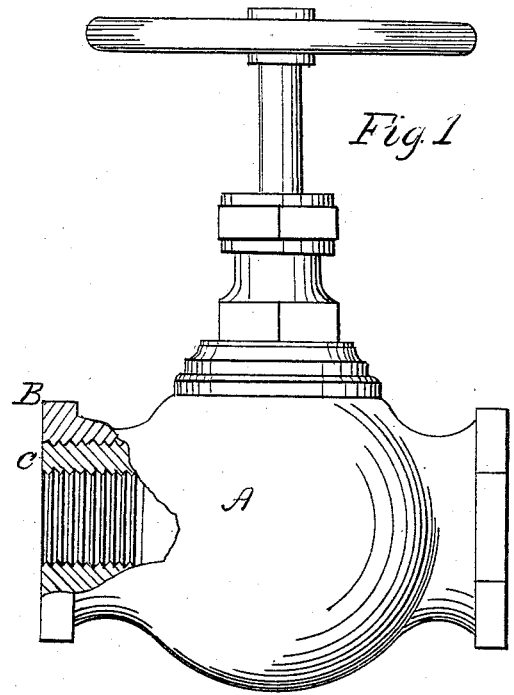
Figure 1 is a view of an ordinary globe-valve, with a portion of one end broken away.
Figure 2:
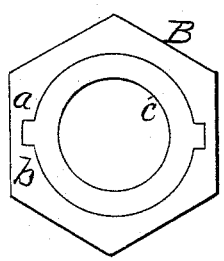
Figure 2 is an end view, showing a modification in the construction and manner of inserting the bushing.

The object of my invention is to produce a cheap and economical valve-casing or chest, with ends not liable to be split, enlarged, or fractured by the fitter in connecting the pipes to them, and thus obviate the objections to the valves now in use. This is accomplished by bushing the ends of iron valve-casings with the ordinary composition of tin and copper, as shown in figs. 1 and 2. It may be done by inserting the bushing C, with a screw-thread, into the ends, B, of the valve A, as shown in fig. 1, or by providing the ends of the valve with recesses $a$, and the bushing C with corresponding ears, $b$, of the proper size to fit these recesses, and then driving the bushing C to its place, as shown in fig. 2.

As the bushing is of softer metal than the iron, and at the same time possesses considerable elasticity, it is obvious that the pipes can be fitted into the ends of valves thus bushed, without danger of splitting, fracturing, or enlarging them, while they are at the same time made perfectly steam-tight.

In this way I am able to produce an iron casing for the valve, that is not only cheaper, but at the same time superior to the brass or other valves now in use.

Having thus described my invention,

What I claim, is—

The construction of the bodies of globe, angle, check, and other valves, with bushing, made of the ordinary composition of tin and copper, in their ends, substantially as herein described.

E. H. ASHCROFT.

Witnesses:
EDWIN J. WRIGHT,
CHARLES E. ASHCROFT.